March 22, 1932.  A. VERMEULEN  1,850,296
FISHING DEVICE
Filed Feb. 12, 1929
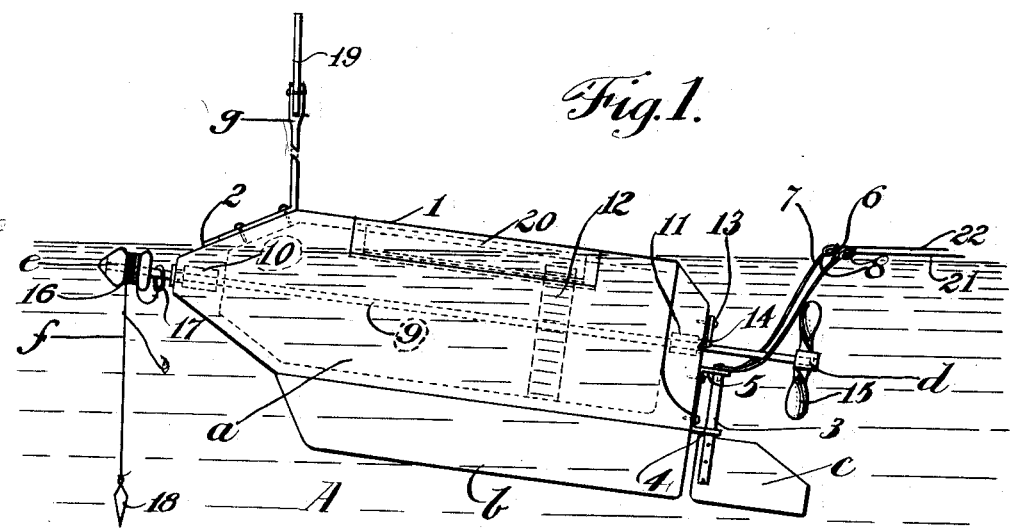
Fig.1.
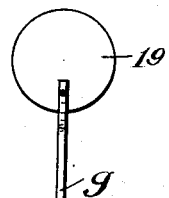
Fig.2.
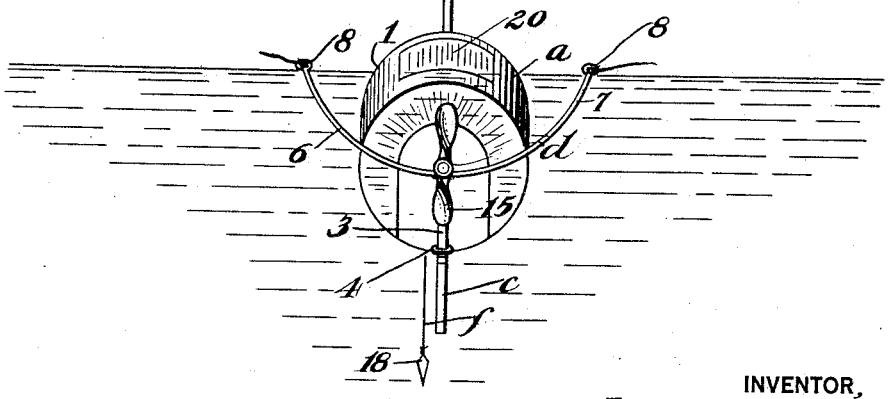
INVENTOR,
Aurèle Vermeulen;
BY
ATTORNEY Patented Mar. 22, 1932

1,850,296

UNITED STATES PATENT OFFICE

AURÈLE VERMEULEN, OF LOS ANGELES, CALIFORNIA

FISHING DEVICE

Application filed February 12, 1929. Serial No. 339,452.

This invention relates to fishing devices, and has for an object the provision of a device whereby movement of the fish line and its positioning within a body of water may be controlled at the will of the fisherman. Ofttimes a fisherman on a wharf may desire to have his line at considerable distance from the wharf and at a distance greater than he can throw a line. Under these circumstances, the present device is efficient as the device can be regulated to go any distance desired.

Another object is the provision of a device wherein the exact position of the fish line may be readily determined as well as a device so arranged that a "catch" may be readily noticed by the fisherman.

The device about to be described comprises in its simplest embodiment a member carrying a fish line and means for automatically moving said member or propelling said member through water, in combination with means controlled by a fisherman at some remote point for directing the course of said device through the water, to the end that the positioning of the device is at the control of the fisherman.

Other objects include a device which is simple of construction, positive in operation, and with nothing likely to get out of order.
With the above and other objects in view, the invention consists in the novel and useful provision, formation, construction, association and relative arrangement of parts, members and features, all as shown in a certain embodiment in the accompanying drawings, described generally, and more particularly pointed out in the claims.

In the drawings:

Figure 1 is a side elevation of the improved device, and,

Figure 2 is a rear elevation of the device shown in Figure 1.

Referring now with particularity to the drawings, the improved device is designated as an entirety by A, and the same includes a casing $a$ provided with a keel $b$, a rudder $c$, propulsive means $d$ for driving the body through the water, and means $e$ for reeling or unreeling a fish line $f$ as well as a semaphore device $g$, all of which elements and means may be utilized in practicing one embodiment of the invention.

The casing $a$ may be of any conventional construction and in the present instance includes a cylindrical body portion 1 having a conical nose 2. Within the scope of my invention, I make this casing cigar-shaped or stream-lined. This casing has attached thereto the keel $b$ so that the casing may be maintained in a given position and prevented from rotating. A rudder member $c$ carries a shaft 3, the shaft being secured to brackets 4 and 5 fastened to the stern of the casing. Secured to said shaft are a pair of arms 6 and 7, the arms at their extremities being spaced a considerable distance apart and provided with rings or eye portions 8.

Passed s u b s t a n t i a l l y longitudinally through the casing is a shaft 9 and which shaft is suitably accommodated in bearings at ends of said casing, as shown at 10 and 11. This shaft is adapted to be rotated by some mechanical means which may contemplate a motor of some type, whether it be steam, electrical, compressed air, or spring actuated, although in the present instance and for the purpose of illustration only, I have shown a spring type of motor at 12. This would comprise the usual spring, one end of which is attached to the shaft and the other end of which is attached to the casing with suitable ratchet means for holding the spring against unwinding until it is desired to turn the shaft. This ratchet is shown at 13 and comprises an arm attached externally to the casing and at one end of said casing with said ratchet fitted within a small groove in the shaft, as shown at 14. This shaft carries externally of the casing a propeller 15. The opposite end of the shaft is adapted to carry the means $e$ which, in the present instance, is a reel adapted to have wound thereabout a fish line $f$ as shown at 16. However, one end of the fish line is attached to a ring 17, which ring is loosely carried upon the shaft 9 between the head of the casing and the said reel. The opposite end of said line carries a sinker 18 and likewise the usual fish hook is supplied.

Attached to the casing is the means $g$ constituting an arm, with some signalling device 19 carried at the end of the arm.

An inspection plate 20 normally covers an opening, permitting entrance within the casing and so that adjustments may be made upon the motor, if necessary.

The operation, uses and advantages of the invention just described are as follows:

Lines 21 and 22 are respectively connected to the arms 6 and 7 at the eye portions 8 thereof and these lines are adapted to control the path of movement of the device A when it is within a body of water. An operator of said device would first see that the fish line was rove about the reel e and that the motor 12 was ready to operate and turn the shaft 9. After the fish line has been properly baited, the detent 13 would be released from the shaft so that the shaft might turn under motor power and rotate the propeller. The operator would guide movement of the device by pulling upon one or the other of the lines 21 and 22 which would, of course, turn the rudder. As the propeller turns, the reel will likewise turn and allow the fish line to sink to greater depths in the body of water. The operator can arrest movement of the craft A by simply holding the lines 21 and 22 until the motor has ceased to operate, at which time the line will, of course, have unreeled. After the line is completely unreeled, the line will be held by the ring 17 on the shaft. The semaphore is visible above the surface of the water and when a fish is caught, the movement of the semaphore and the rapid pull upon the craft A will indicate to the fisherman "a catch".

A device of this character is exceedingly simple of construction and from a sportive standpoint is attractive and to the fisherman upon the wharf allows him to get away from other lines in his immediate vicinity, the existence of which more often than not tends to frighten the fish so that the catch is not as good.

It is obvious that various changes and modifications and variations may be made in practicing the invention in departure from the particular showing of the drawing without departing from the true spirit of the invention.

I claim:

1. In a device of the character disclosed, a casing, a motor propelled shaft carried thereby, a reel on said shaft having a fish line rove thereabout, and means on said shaft for causing movement of said casing when the motor is operated.

2. In a device of the character disclosed, a casing, a motor propelled shaft carried thereby, a reel on said shaft having a fish line rove thereabout, means on said shaft for causing movement of said casing when the motor is operated, and means for directionally controlling the path of said movement.

3. In a device of the character disclosed, a casing, a shaft carried thereby, a reel on one end of said shaft, and a propeller at the opposite end thereof; motive means for rotating said shaft whereby when said casing is placed within a body of water and the motive means operated, said propeller will drive said casing, and simultaneously cause an unreeling of any line upon said reel.

4. In a device of the character disclosed, a casing, a motor housed therein, a shaft extending through said casing and turned by said motor, means on said shaft whereby when the shaft is turned the casing is driven, a reel on said shaft, and a line rove about said reel and whereby when the shaft is turned to drive the casing the line is unreeled.

5. In a device of the character disclosed, a casing, means for propelling said casing through a body of water, and means controlled from a remote point for steering the course of said casing, in combination with a semaphore for indicating at all times the position of the casing in said body of water.

In testimony whereof, I have signed my name to this specification at Los Angeles, California, this 1st day of February, 1929.

AURÈLE VERMEULEN.